United States Patent Office 3,331,872
Patented July 18, 1967

3,331,872
DICHLOROMETHANEDISULFENYL CHLORIDE AND ITS PREPARATION
Harold M. Pitt, Lafayette, and Harry Bender, El Cerrito, Calif., assignors to Stauffer Chemical Company, New York, N.Y., a corporation of Delaware
No Drawing. Filed Apr. 13, 1964, Ser. No. 359,461
3 Claims. (Cl. 260—543)

This invention relates to a new and novel composition of matter. Specifically, this invention relates to the new and novel compound dichloromethanedisulfenyl chloride.

The compound of the present invention is not known in prior art. H. Kolbe, Ann. 54, 148 (1845), first treated carbon disulfide with dry chlorine and accidentally prepared trichloromethane sulfenyl chloride. Later, other investigators such as B. Rathke, Ber., 3,860 (1870), Ann., 167 195, 200 (1873), and P. Klason, Ber., 20, 2376 (1887), worked to establish the structure of trichloromethane sulfenyl chloride. These investigators proposed a mechanism which involved the formation of thiocarbonyl dichloride from a hypothetical intermediate chlorothiocarbonyl sulfenyl chloride. This then was presumed to be chlorinated to trichloromethane sulfenyl chloride.

It has now been found that the action of dry chlorine gas on pure carbon disulfide leads to good yields of the novel and useful compound dichloromethane disulfenyl chloride

This unexpected result can be brought about and regulated by the simultaneous control of several reaction conditions.

In the present invention the formation of dichloromethane disulfenyl chloride is accomplished by the action of dry chlorine gas on carbon disulfide in the presence of actinic radiation. Two reactions occur in the reaction mixture:

(1) 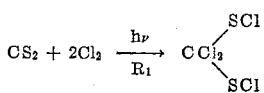

(2) 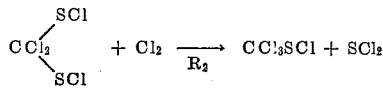

The rate of Reaction 1 is dependent upon the density of usable quanta in the reaction mixture. The rate of Reaction 2 is highly dependent upon temperature. The higher the temperature the faster will be the rate of the subsequent Reaction 2. This was found to be the case when Reaction 1 was performed at temperatures greater than or equal to room temperature with only moderate actinic irradiation; the predominating product was found to be trichloromethane sulfenyl chloride, via Reaction 2. When this happens autocatalysis occurs because the sulfur dichloride also produced in Reaction 2 acts as a catalyst for the chlorination of dichloromethane disulfenyl chloride, hence a further increase in the rate of Reaction 2. However, if sufficient actinic energy is employed in Reaction 1 the rate of this reaction will be such that it will predominate. This leads to the relationship of Reactions 1 and 2 that requires Reaction 1 to be performed at a temperature sufficiently low enough to allow the available quanta of the actinic radiation source to make the rate of 1 much greater than Reaction 2.

It then follows that the compound of the invention can be readily prepared by the reaction of dry chlorine gas with carbon disulfide in the presence of an initiator for free-radical reactions. The choice of initiator for free-radical reactions is one of convenience, suitable initiators being actinic radiation such as ultraviolet light, an organic peroxide or hydroperoxide, or an aliphatic azo compound or the like. Unfortunately the employment of organic peroxides, hydroperoxides or aliphatic azo compounds and the like are restricted by the nature of their actuation, which requires somewhat higher temperatures than that desired for the predominance of Equation 1, supra.

The temperature of the reaction is kept as low as operability permits and preferably lies between −30° and +30° C. The pressure used is generally atmospheric. During the reaction period the contents of the reaction vessel are preferably mixed, for example, by mechanical stirring.

The chlorine used must be dry. The carbon disulfide must be pure, dry, and free of dissolved sulfur or potential Friedel-Crafts catalyst. The latter impurity will catalyze the chlorination of the disulfenyl chloride to trichloromethane sulfenyl chloride, carbon tetrachloride, and sulfur dichloride. The ratio in which the reactants are used is not critical but for maximum yield of the product it is preferred to saturate the carbon disulfide with the chlorine gas during the reaction.

The compound of the present invention is useful as an intermediate in preparing other compounds, as a fungicide and as post-emergence herbicide.

The following examples illustrate the preparation and utility of the novel compound.

*Example 1.—Preparation of dichloromethane disulfenyl chloride*

A charge of 350 cc. of carbon disulfide was continually saturated with dry chlorine gas at −5° C. The stirred solution was illuminated with sixteen 15-watt 360 BL G. E. fluorescent lights as the source of actinic radiation. The reaction was continued for eight hours. There was obtained a yield of 72 grams of product containing over 90% dichloromethane disulfenyl chloride and 10% trichloromethane sulfenyl chloride. The excess chlorine and carbon disulfide were removed in vacuo at 20 mm. The residue was placed in a molecular still. At a reduced pressure of about 0.05μ, the trichloromethane sulfenyl chloride and traces of carbon disulfide were carried into the −78° C. and liquid nitrogen traps. It was found preferable to maintain the distillation flask at room temperature (25–30° C.). At temperatures in excess of 30° C. increasing degrees of decomposition were noted with increase in temperature. The disulfenyl chloride was condensed on the 0° C. condenser and recovered therefrom in substantially pure form.

The infrared spectrum of dichloromethane disulfenyl chloride showed only four absorption peaks. They occur, in order of relative absorption, at 13.7μ (very strong), 12.1μ, 12.8μ, and 12.4μ (medium). The molecular weight was determined by the freezing point depression of benzene to be 225, calculated 218. Elemental analysis: Calculated for $CCl_4S_2$: C, 5.52%; S, 29.4%; Cl, 65.18%. Found: C, 5.7%; S, 29.38%; Cl, 65.14%. The specific gravity at 24° C. was 1.745 and $n_D^{30}$ was 1.5998. Extrapolation of vapor pressure data gave an atmospheric boiling point of about 183° C.

*Example 2*

*Fungicide.*—The compound of the present invention was subjected to soil fungicide incorporation tests which indicate whether or not a compound is active against soil-borne pathogenic fungi. The chemical was pipetted into *Fusarium solani* infested soil at various rates, mixed, and then placed in paper containers. Beans were planted into the infested and treated soil. Three to four weeks later the plants were inspected for disease symptoms. It was found that dichloromethane disulfenyl chloride controlled the fungus *Fusarium solani* at 100 p.p.m. (parts per million) concentration in the soil.

*Herbicide.*—Seeds of crab grass, watergrass and wild oats were planted in individual rows one-half inch deep in Santa Cruz sandy loam soil. After growing for two weeks under greenhouse conditions the plants were sprayed using a paint sprayer until run-off with a 0.5% solution of the compound, which amounts to a rate of approximately 12 pounds per acre. Two weeks later injury results were recorded. The following results were obtained: Crab grass, *Digitaria sanguinalis* (L.), 70% inhibition of growth or injury; watergrass, *Echinochloa crusgalli* (L.), and wild oats, *Avera fatua* (L.), growth was almost completely stopped.

Various changes and modifications may be made in the invention herein described as will be apparent to those skilled in the chemical arts. It is accordingly intended that the present invention shall only be limited by the scope of the appended claims.

We claims:
1. The compound dichloromethane disulfenyl chloride corresponding to the formula

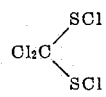

2. The method of preparing dichloromethane disulfenyl chloride comprising the reaction of substantially dry chlorine gas on essentially pure carbon disulfide in the presence of a free-radical initiator.
3. The method of preparing dichloromethane disulfenyl chloride comprising the reaction of substantially dry chlorine gas on essentially pure carbon disulfide in the presence of actinic radiation.

No references cited.

LORRAINE A. WEINBERGER, *Primary Examiner.*
H. C. WEGNER, *Assistant Examiner.*